United States Patent
Li et al.

(10) Patent No.: US 11,561,979 B2
(45) Date of Patent: Jan. 24, 2023

(54) DYNAMICALLY DETECTING AND CORRECTING ERRORS IN QUERIES

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/013,956

(22) Filed: Sep. 8, 2020

(65) Prior Publication Data

US 2022/0075783 A1 Mar. 10, 2022

(51) Int. Cl.
| | |
|---|---|
| G06F 16/2455 | (2019.01) |
| G06F 16/2453 | (2019.01) |
| G06F 11/34 | (2006.01) |
| G06F 16/248 | (2019.01) |
| G06F 16/22 | (2019.01) |

(52) U.S. Cl.
CPC .... *G06F 16/24553* (2019.01); *G06F 11/3409* (2013.01); *G06F 16/221* (2019.01); *G06F 16/2282* (2019.01); *G06F 16/248* (2019.01); *G06F 16/24542* (2019.01); *G06F 16/24552* (2019.01); *G06F 16/24568* (2019.01)

(58) Field of Classification Search
CPC ......... G06F 16/24553; G06F 16/24568; G06F 16/2282; G06F 16/24552; G06F 16/248; G06F 11/3409; G06F 16/24542; G06F 16/221
See application file for complete search history.

(56) References Cited

U.S. PATENT DOCUMENTS

| | | |
|---|---|---|
| 8,700,876 B2 | 4/2014 | Shah et al. |
| 8,806,275 B1 | 8/2014 | Vannatter et al. |
| 8,943,354 B2 | 1/2015 | Canini et al. |
| 9,477,707 B2 | 10/2016 | Chi et al. |

(Continued)

FOREIGN PATENT DOCUMENTS

WO 2016135620 A1 9/2016

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Dangelino N Gortayo
(74) *Attorney, Agent, or Firm* — Daniel M. Yeates (57) ABSTRACT

A computer-implemented method dynamically detects and corrects an error in a query. The method includes identifying an error in a first query. The method further includes generating a set of alternate execution structures for the first query. The method includes running each of the alternate execution structures, including generating a set of results corresponding to each set of alternate execution structure, comparing each of the set of results against each other of the set of results, and storing each of the set of alternate execution structures to include a result of the set of results, for each alternate structure. The method further includes selecting, from the set of alternate execution structures, a first alternate execution structure based on a predetermined criteria, and implementing the first alternate structure in place of the first query.

20 Claims, 6 Drawing Sheets

(56) References Cited

U.S. PATENT DOCUMENTS

| | | | |
|---|---|---|---|
| 9,594,802 B2* | 3/2017 | Krishnamurthy | G06F 16/2428 |
| 9,804,935 B1 | 10/2017 | Holenstein et al. | |
| 9,946,534 B1* | 4/2018 | Thompson | G06F 16/2365 |
| 10,318,586 B1* | 6/2019 | Rose | G06F 16/285 |
| 10,579,635 B1* | 3/2020 | Mishne | G06F 16/3323 |
| 11,106,690 B1* | 8/2021 | Dhillon | G06N 5/003 |
| 11,113,294 B1* | 9/2021 | Bourbie | G06F 16/2448 |
| 2016/0062870 A1* | 3/2016 | Menahem | G06F 11/3664 |
| | | | 717/125 |
| 2018/0144024 A1* | 5/2018 | Fu | G06F 16/2453 |
| 2019/0347298 A1* | 11/2019 | Kumar | G06F 40/284 |
| 2019/0392066 A1* | 12/2019 | Kim | G06F 16/24578 |
| 2021/0240710 A1* | 8/2021 | Korlapati | G06F 16/24537 |

\* cited by examiner

DYNAMICALLY DETECTING AND CORRECTING ERRORS IN QUERIES

BACKGROUND

The present disclosure relates to database management, and, more specifically, to detecting and correcting errors in database queries.

Modern database systems can contain relatively large amounts of data, on the order of petabytes ($2^{50}$ bytes) and greater. Careful attention is given while generating the queries configured to retrieve, filter, sort, and/or perform other functions on the data. However, errors can still be present in the queries.

SUMMARY

Disclosed is a computer-implemented method to dynamically detect and correct an error in a query.

The method includes, identifying an error in a first query, wherein the identifying is in response to a database receiving the first query. The method further includes, generating a set of alternate execution structures for the first query. The method also includes, running each of the alternate execution structures, wherein the running includes generating a set of results corresponding to each alternate execution structure in said set of alternate execution structures. The method includes comparing each of the set of results against each other of the set of results. The method also includes storing each of the set of alternate execution structures to include a result of the set of results, for each alternate structure. The method further includes selecting from the set of alternate execution structures, a first alternate execution structure based on a predetermined criteria, and implementing the first alternate structure in place of the first query.

Further aspects of the present disclosure are directed to a computer program products containing functionality consistent with the method described above.

Also disclosed is a system comprising a processor, and a computer-readable storage medium communicatively coupled to the processor and storing program instructions which, when executed by the processor, are configured to cause the processor to identify, in response to a database receiving a first query, a first error in the first query. The program instructions are further configured to cause the process to determine a scope of the first error. The program instructions are also configured to cause the process to identify a second query, wherein the second query includes a characteristic in common with the first query. The program instructions are configured to cause the process to determine the second query contains a second error within the scope of the first error. The program instructions are further configured to cause the process to generate, for the second query, a set of alternate execution structures. The program instructions are also configured to cause the process to run each alternate execution structure in the set of alternate execution structures. The program instructions are further configured to cause the process to select a second alternate execution structure from the set of alternate execution structures. The program instructions are further configured to cause the process to replace an execution structure of the first query with the second alternate execution structure.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Modern database systems can contain relatively large amounts of data, on the order of petabytes ($2^{50}$ bytes) and greater. This data can be accessed by queries configured to retrieve, filter, sort, and/or perform other functions on the data. However, errors can be present in the queries.

In order to increase the efficiency of database systems and query performance, embodiments of the present disclosure can dynamically identify and correct errors in a query. Additionally, embodiments of the present disclosure can use the error to identify and remedy unknown errors in queries similar to the previously identified error.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
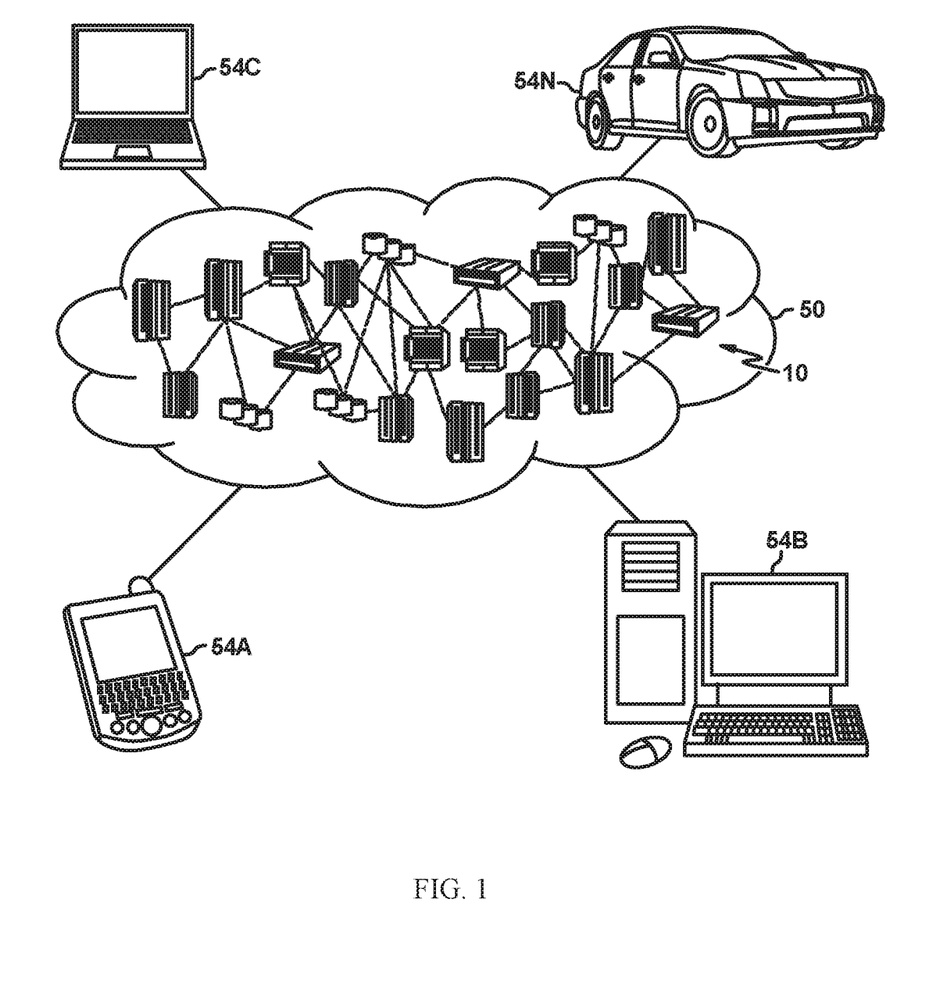
FIG. 1 depicts a cloud computing environment according to embodiments of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
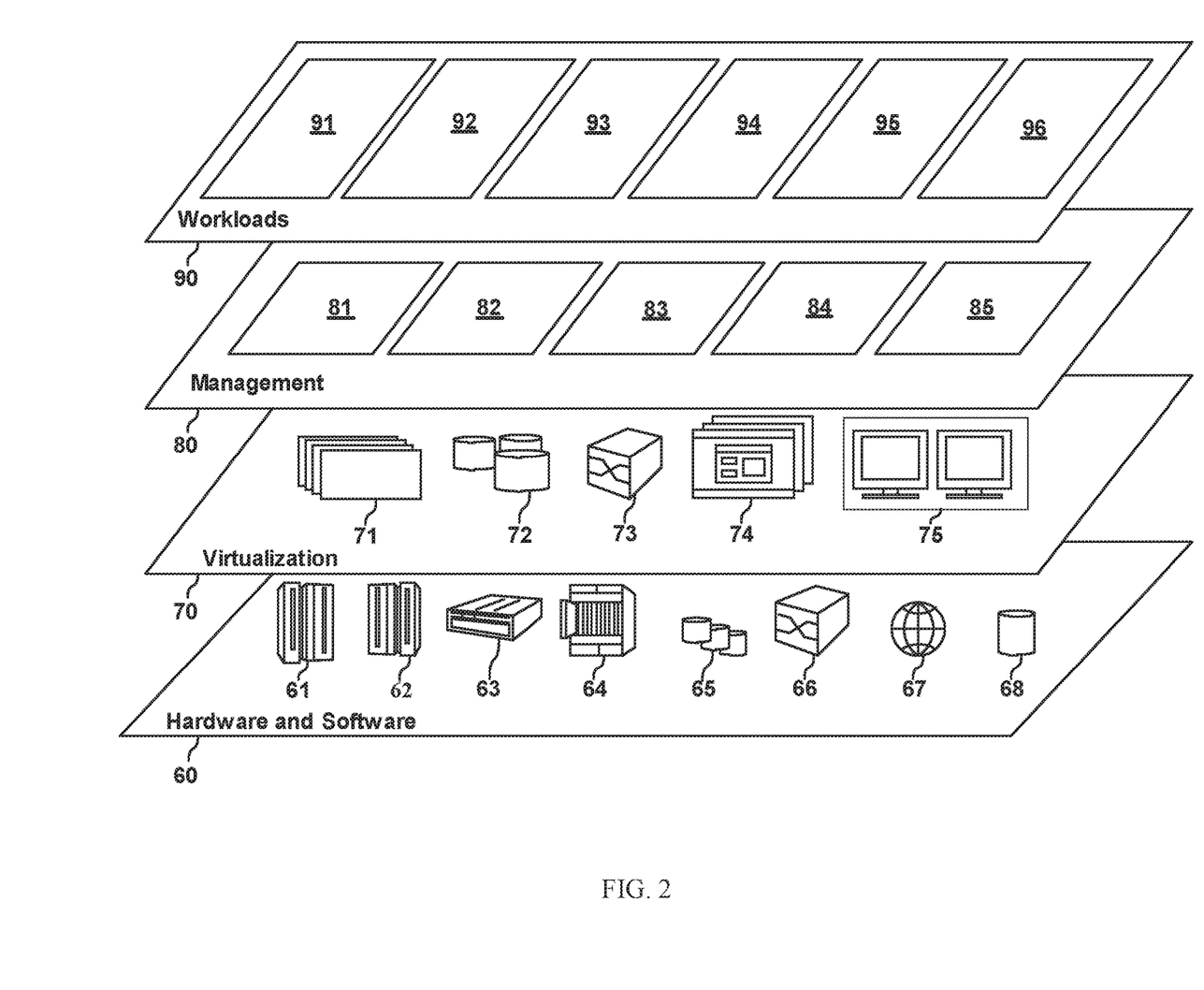
FIG. 2 depicts abstraction model layers according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
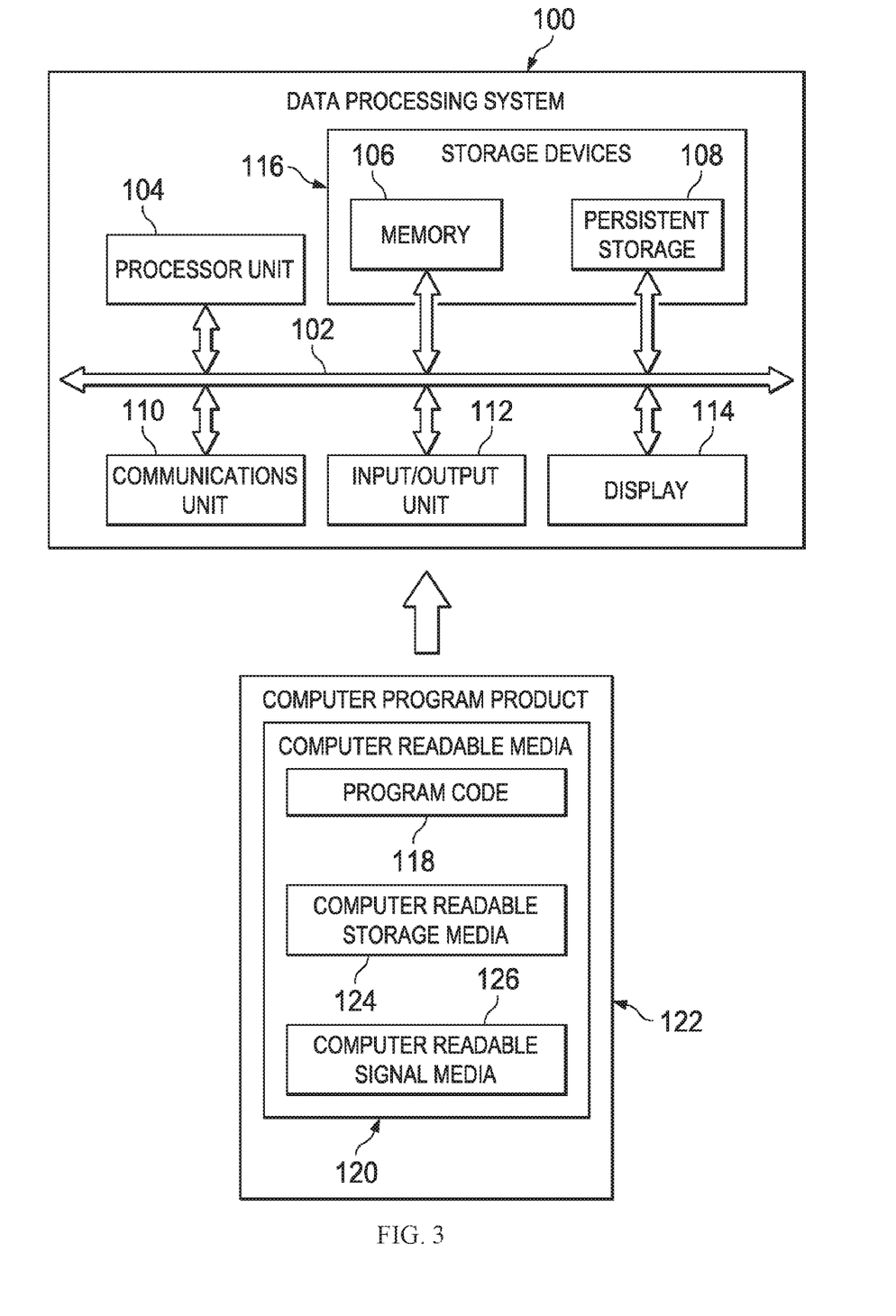
FIG. 3 is a block diagram of a DPS according to embodiments of the present disclosure.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Dynamic Identification and Remediation of Query Errors

Creating and maintaining database queries can be a long and time-consuming process. As such, error, or mistakes, can be inadvertently included in queries causing improper and/or inefficient processing of queries. Additionally, even when the original query is correct, system updates can create processing changes and/or name changes that may introduce previously non-existent errors into queries. In this way, a system update and/or configuration change can lead to an error that did not occur prior to the update.

Having a query with an error can cause a plethora of processing issues. Generally, it takes a lot of time and effort to identify and correct the error, if the error can be identified at all. Identifying and correcting the error can result in database down time. This down time can result in negative consequences for the party that owns and/or operates the database system. As such, a system that can identify and fix an error relatively quickly, even if the fix is temporary, can increase the overall efficiency of a system. Further, such a system can allow for better long-term correction of issues by eliminating unplanned and/or unscheduled rework to identify and remedy errors.

Accordingly, embodiments of the present disclosure can dynamically identify and correct an error in a query. In some embodiments, the identification includes the portion of the query (e.g., access plan, etc.) that is causing the error as well as the error itself. Additionally, the identified error can be used to identify and correct similar errors in other queries to pre-empt repeating the error, with all the negative consequences, such as unexpected downtime.

A database query can be written in a structured query language (SQL). SQL is a programming language for databases. The SQL language includes multiple instructions for managing (storing and/or retrieving) data in one or more databases. The query may be parsed by an SQL parser. Parsing is the process of interpreting and/or translating the SQL into a form that can be processed by the database management system (DBMS). In some embodiments, parsing includes generating an access plan (or execution plan). Each database system can have various settings to determine how an access plan is generated. It is possible to have multiple access plans for a single query. In general, a database receives a query, parses the query, generates an access path (or execution structure), optimizes the access path, and executes the query.

Some embodiments of the present disclosure can identify a query with an error (the identified query). In such embodiments, one or more alternate execution structures are generated for the identified query. Further, each of the alternate execution structures can be executed and the results compared. Additionally, the executed structures can be grouped based on their results. All equivalent sets of results can be placed in a common group.

In some embodiments, comparing the results can be used to identify a correct set of results. The correct set can be based on which results are more common, or the comparatively largest set of results). Alternatively, the correct results can be previously identified, or otherwise received by the database system.

In some embodiments, each of the alternate execution plans is stored, along with the execution data and/or other database statistics. In some embodiments, an alternate execution structure is selected and implemented. The selected alternate plan can be selected from the group of queries that produced the correct set of results. In some embodiments, the selected alternate plan can be the plan having comparatively greater similarity to the original plan. In some embodiments, the selected alternate plan is implemented in place of the original query. In some embodiments, the implementation is in response to an authorized user approving the change to the query.

Embodiments of the present disclosure can use the identified error to remedy errors in similar queries. A similar query can be any query that has a common source (e.g., host, application, owner, etc.), a common target (e.g., table, column, etc.), and/or a common function. The common function can include common instructions (e.g., code), a similar (or partially similar) execution path (e.g., a matching branch), a common command (e.g., filter, sort, fetch, etc.), and/or other similar functions. In some embodiments, each query that is considered similar can be checked for errors. An alternate plan can be generated and implemented in response to determining the similar query includes an error.

In some embodiments, the implemented alternate structures can be temporary fixes. Even if temporary, such fixes can allow for the queries to be processed without error until a more permanent solution can be provided. This can increase the overall efficiency of database systems by reducing the number of known or unknown errors and/or reducing the amount of time one or more queries are unusable.

The aforementioned advantages are example advantages, and embodiments exist that can contain all, some, or none of the aforementioned advantages while remaining within the spirit and scope of the present disclosure.

Figure 4:
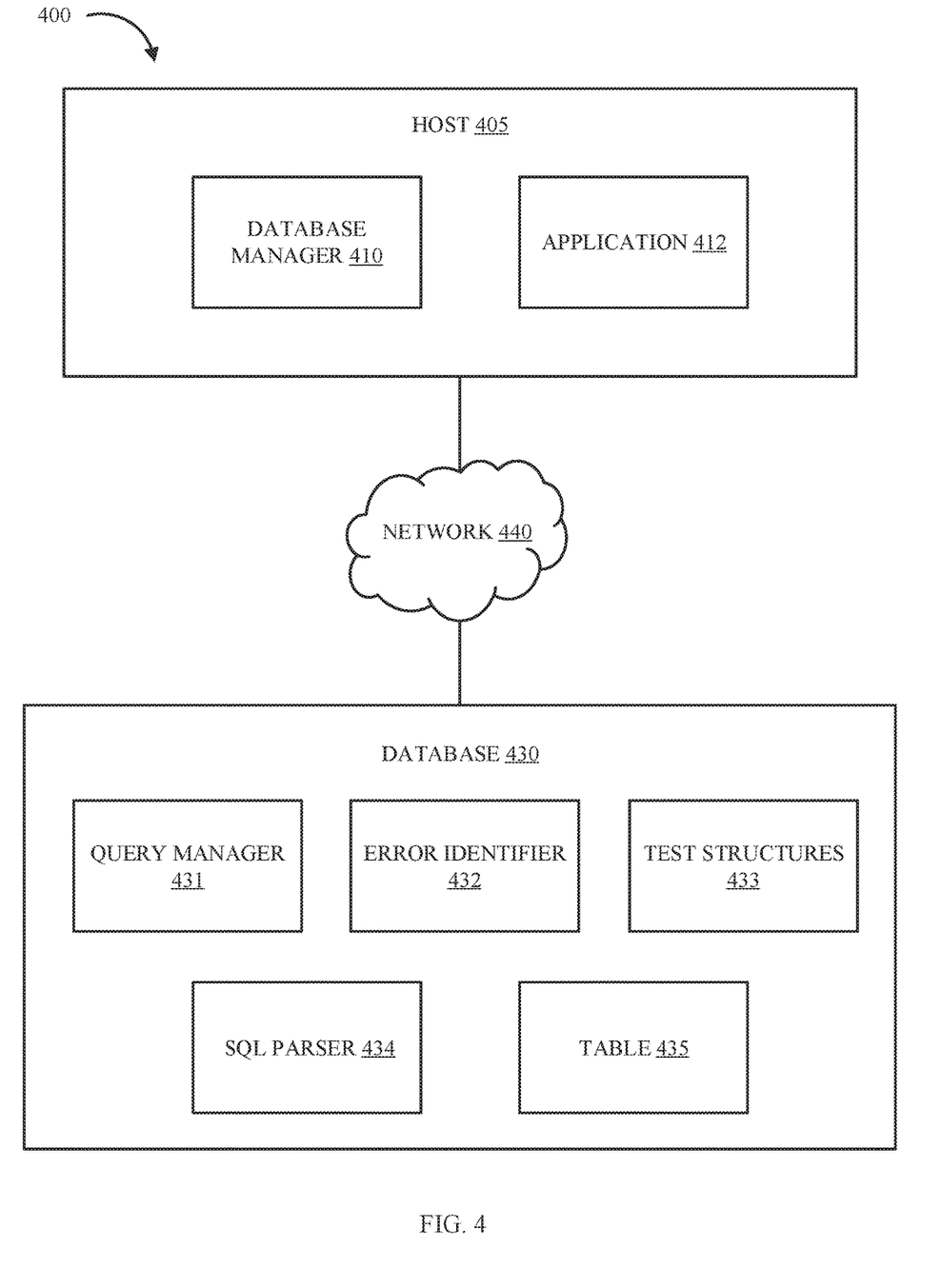
FIG. 4 is a functional diagram of a computing environment suitable for operation of a query manager according to embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405, and/or database 430 may include a computer system, such as the data processing system 100. In some embodiments, host 405, and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410, and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, application 412 is included in database manager 410. In some embodiments, application 412 can generate/send two or more different queries. In some embodiments, the two or more queries can have similar characteristics and/or be of a similar type. The similarity can cause identification of errors in the queries to be identified, based on an error in a similar query.

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430.

In some embodiments, the query is generated in SQL. In some embodiments, application 412 displays the results of the query. The results may be returned in an SQL format, and/or as images, graphs, trends, and/or other similar formats.

Database 430 can be any combination of hardware and/or software configured to store data in a database system. In some embodiments, database 430 is part of a federated database system. In some embodiments, database 430 includes two or more databases communicatively connected. In some embodiments, database 430 may be contained within host 405. In some embodiments, database 430 can include query manager 431, error identifier 432, test structures 433, SQL parser 434, and table 435.

Query manager 431 can be any combination of hardware and/or software configured to oversee execution of an SQL query. In some embodiments, query manager 431 includes security error identifier 432, test structures 433, SQL parser 434, and table 435. However, FIG. 4 depicts them as separate components for discussion purposes.

Error identifier 432 can be any combination of hardware and/or software configured to identify errors in a query. In some embodiments, query error can be one of an execution error or an incorrect output error. An execution error can be any error that prevents proper execution of the query. In some embodiments, an execution error is identified by receiving an "error" message while executing the query. The error message can be generated in response to a determination the query cannot be executed as written. For example, if a query attempts to fetch a query from a table "SALES", but the table is called "SALESDATA", query manager 431 would be unable to properly execute the query, and can return an error message to the source of the query.

In some embodiments, an incorrect output error occurs when the results returned from the query are different than the expected results. Said another way, the actual set of results from the query is different than the expected set of results of the query. The incorrect output can include one or more of excess results, a lack of results, a mis-ordering of the results, an incorrect filtering of the results, and the like.

In some embodiments, the incorrect output error can be identified by a user. The user can review the actual set of results to detect an incorrect output. Error identifier 432 can identify the error in response to an indication of an error from the user. In some embodiments, error identifier 432 identifies the incorrect output error automatically. For example, the error identifier 432 can compare the actual set of results against a standard result. The standard result can be a previously executed query that is considered the correct set of results for the query. In this way, the error identifier 432 identifies the error by identifying a difference between the correct set of results, i.e., the standard result, and the actual set of results.

In some embodiments, an incorrect output error can include one or more of a record fail and an order fail. A record fail can occur when improper records are returned. For example, assuming a table includes 10 entries, numbered from 1 to 10, a first query is configured to retrieve the 3 lowest numbers in the table. An example of a record fail is when the query returns a result of [1,2,4], instead of [1,2,3]. An example of an order fail is when the query returns a result with the returns the correct values, but in an improper order. For example, if the query returns [1,3,2], instead of [1,2,3]

In some embodiments, error identifier 432 can identify queries similar to the current query. This may allow identification and remediation of additional queries that may contain the same errors. In some embodiments, the additional queries can be identified by comparing the query with an error to other queries. In some embodiments, queries can be similar if they have a similar source. A source can be one or more of a host 405, database manager 410, application 412, and/or the company/organization that owns/operates/controls the query. In some embodiments, a query can be similar if it has a similar target. The target can be the target database, a target table, and/or a target column or set of data within a table. Further, the query can be similar if it includes a common action/command. A common command can include a common instruction (e.g., code), and/or a common structure. The common structure can be the entire structure, or a branch or other portions of the structure of the access plan.

Test structures 433 can be any combination of hardware and software configured to store and implement alternate execution plans of a query. In some embodiments, in response to an error, one or more alternate execution paths can be generated in an attempt to correct the error. Each alternate execution plan can be stored in test structure 433.

In some embodiments, one of the test structures can be selected as a new correct execution path. A copy of the new execution path and the original execution path can be stored in test structures 433. This can help to ensure that query changes are not permanently changed by mistake.

In some embodiments, the original execution path (and previously identified execution paths that output errors) can be stored in test structure 433. In some embodiments, the original execution path can be used to identify similar queries. The similar queries can thus be tested to determine if they include one or more execution errors. In some embodiments, the original execution path and previous execution paths can be sorted based on one or more characteristics of the query. For example, each query that includes a specific type of filter (or any other SQL command) can be grouped. A query can be included in more than one group.

In some embodiments, the new correct execution path (and/or previous corrected execution paths) can be used by SQL parser 434 in generating the one or more alternate execution paths.

The SQL parser 434 can be any combination of hardware and/or software configured to determine actions to be performed from a query. In some embodiments, SQL parser 434 determines individual commands to fully execute the query (e.g., return a set of data). In some embodiments, SQL parser 434 develops an access plan. The access plan may include a stack(set) of commands, where each command is considered a node.

In some embodiments, SQL parser 434 generates one or more alternate (or candidate) execution structures (or access paths, or execution path) for a query. The alternate execution structures can be generated in response to identifying an error in the query. Each of the alternate execution paths can be stored in test structures 433.

Table 435 can be any data structure configured to store and organize data. Table 435 can include one or more separate tables. Each table can include one or more columns. In some embodiments, table 435 is a target of queries.

Figure 5:
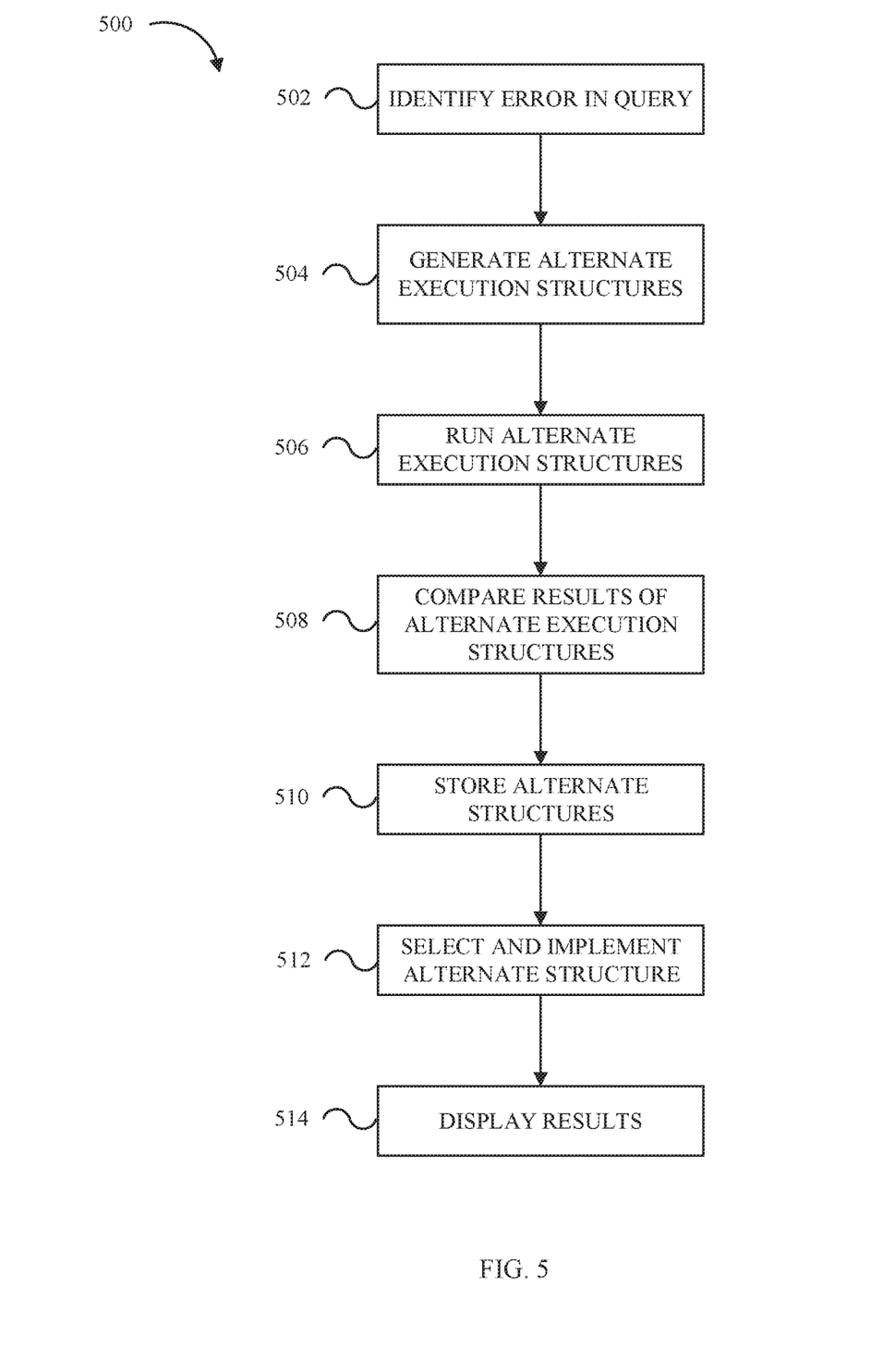
FIG. 5 is a flow chart of an example method to dynamically identify and correct an error in a query according to embodiments of the present disclosure.
Figure 6:
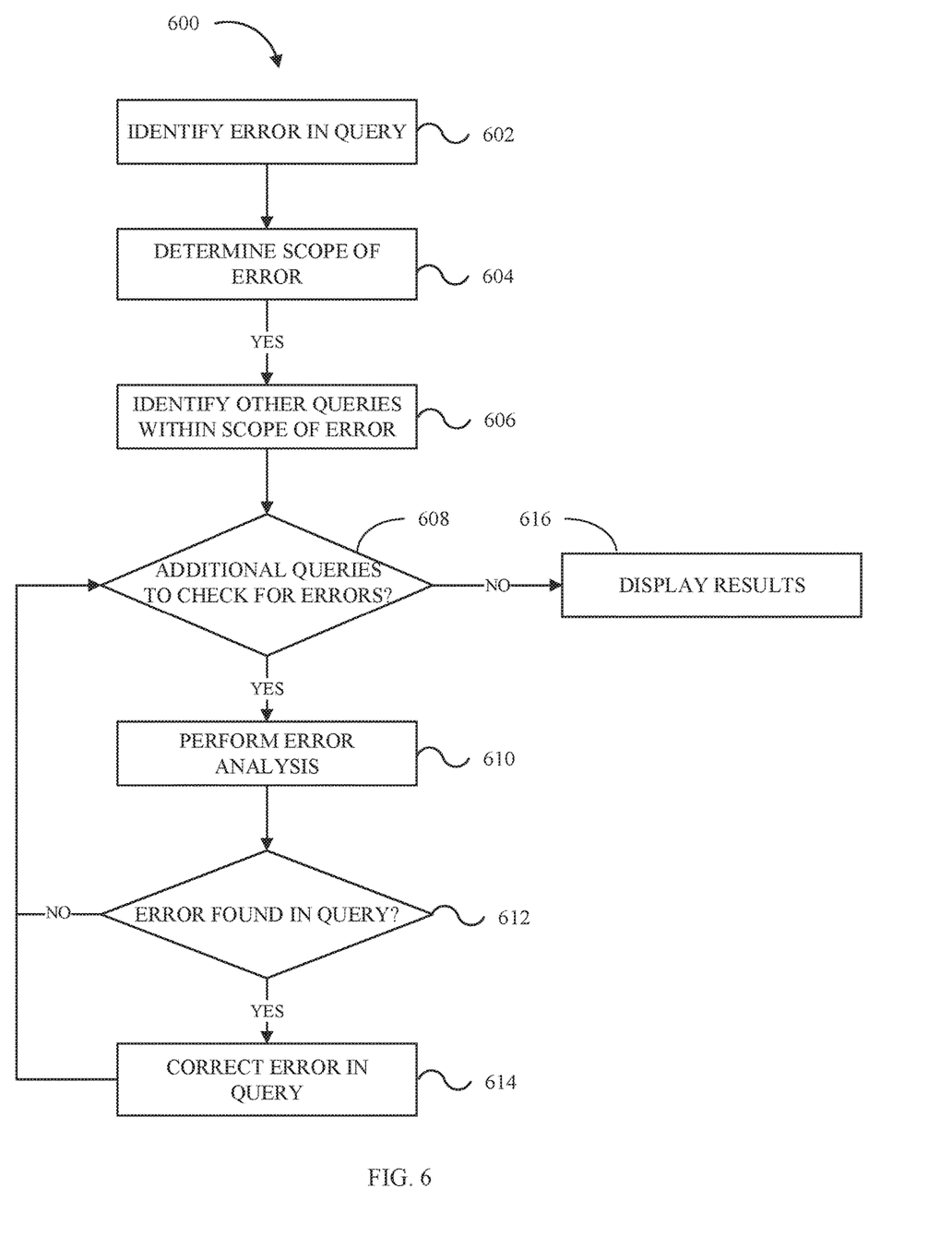
FIG. 6 is a flow chart of an example method to dynamically identify and correct errors in one or more queries according to embodiments of the present disclosure.

Methods 500-600 can be implemented by one or more processors, host 405, database manager 410, application 412, database 430, query manager 431, error identifier 432, test structures 433, SQL parser 434, table 431 and/or a different combination of hardware and/or software. In various embodiments, the various operations of method 500 are performed by one or more of host 405, database manager 410, application 412, database 430, query manager 431, error identifier 432, test structures 433, SQL parser 434, and table 431. For illustrative purposes, the method 500 will be described as being performed by query manager 431.

FIG. 5 is a flow chart of an example method, method 500, to dynamically identify and correct an error in a query according to embodiments of the present disclosure. The method 500 can be performed in a computing environment (e.g., computing environment 400 and/or cloud computing environment 50). One or more of the advantages and improvements described above for generating and monitoring usage patterns may be realized by method 500, consistent with various embodiments of the present disclosure.

At operation 502, query manager 431 can identify an error in a query. In some embodiments, the error is identified in response to running a query on a database. The query with the error can be the identified query. The error can be a query execution error and/or an incorrect output error. In some embodiments, the query execution error is identified in response to receiving an "ERROR" message from a database. The error message can be generated when the query is unable to be processed (e.g., calls for a non-existent table or column).

An incorrect output error can be identified in response to determining the actual results of a query are not the expected results. In some embodiments, the output error is determined by comparing a set of results against an expected set of results. The comparison can be performed automatically (e.g., by error identifier 432) and/or by a user. An error can result when there is any difference between the expected results and the actual results. In some embodiments, each output error can be a record fail and/or an order fail.

Errors can develop in previously correct queries as a result of system changes and updates. For example, SQL parser 434 could be updated and as a result generate a new access path for a query than before the update. Accordingly, in some embodiments, random queries can be selected and checked for new/existing errors. For example, each query used by an organization can be checked every period of time (e.g., weekly, monthly, etc.). In another example, the high use queries can be checked relatively more often than the less used queries.

At operation 504 query manager 431 can generate alternate execution structures for the query with the identified error. In some embodiments, any number of alternate structures can be generated. The number can be adjusted or constant across different queries. There can be a lower threshold, an upper threshold, and/or a predefined number. The number of paths generated can be based on the size/complexity of the query and/or the amount of computing resources used (e.g., a max amount of computing time to generate queries). In some embodiments, a common set of access paths are generated. For example, one set can include a best execution structure (e.g., most efficient), a safest execution structure (e.g., configured to ensure all results are returned with less emphasis on efficiency), and one or more random execution instructions. The best and safest structures can be based on SQL parser 434 data and previous query statistics stored within database 430. Further, each alternate execution structure can be stored in test structure 433.

At operation 506, query manager 431 can run each alternate execution structure. The results of each run are collected and stored. In some embodiments, each set of results can be stored in test structures 433 with the alternate execution structure. Additionally, the database statistics (or execution statistics for each query run) for each alternate structure are gathered and stored with the set of results. The database statistics can include efficiency/processing data which can include processing time, memory usage, computing usage, and other similar factors.

At operation 508, the query manager 431 can compare the results of each alternate execution structure. In some embodiments, the comparing is performed by error identifier 432. More specifically, each set of results can be compared against all other sets of results. They can also be compared against a correct output. The correct output can be pre-marked (or previously identified). In some embodiments, operation 508 includes identifying a correct output. The correct output can be the most common output of all outputs. For example, if ten alternate execution structures are generated and executed, and seven of the ten include the same set of results, then the results that occurred seven times can become the correct output. In some embodiments, the correct output can be based on a predefined alternate structure. This can be used when the fix for the query is considered a temporary fix. For example, the structure that ensures all data is captured (even if less efficient) can be marked as the correct output. Additionally, each alternate structure that produces results that match the correct output can be identified.

At operation 510, the query manager 431 can store the alternate structures. In some embodiments, the structures are stored in test structures 433. Alternatively, each set of results along with the comparison analysis are stored with the alternate structure. In another embodiment, only the alternate structure whose results match the correct results are stored.

At operation 512, the query manager 431 can select and implement an alternate structure. In some embodiments, the alternate structure is selected from the alternate structures that produces the correct set of results. A variety of methods and/or factors can be used to select an alternate structure. For example, the selection can be based on efficiency. In other words, the alternate structure selected can be the structure that used the comparatively least amount of computing resources (e.g., the database statistics collected in operation 506). In another example, the selected alternate structure can be structure that is comparatively more similar to the original structure and/or the comparatively more similar database statistics to the original structure. Alternatively, the selection can be random. Further, in some embodiments, operation 512 includes testing the selected alternate structure.

In some embodiments, query manager 431 implements the selected alternate structure. More specifically, the query manager 431 can mark the query identified in operation 502. The implementation can include replacing the identified query, when it is received again, with the selected alternate execution structure. In some embodiments, the implementation is approved. In some embodiments, the approval is given by a user. The user may have proper authority as be designated by the owner of the query. In some embodiments, the implementation of the selected alternate query is in response to receiving the approval.

At operation 514, the query manager 431 can display the results. In some embodiments, the query manager 431 returns the results to application 412. The results can include one or more of the identified query, the alternate execution structures, the correct set of results, the selected alternate structure, the test run of selected alternate structure, the database statistics, and/or other similar data.

FIG. 6 is a flow chart of an example method, method 600, to dynamically identify and correct errors in one or more queries according to embodiments of the present disclosure. The method 600 can be performed in a computing environment (e.g., computing environment 400 and/or cloud computing environment 50). One or more of the advantages and improvements described above for generating and monitoring usage patterns may be realized by method 600, consistent with various embodiments of the present disclosure.

At operation 602, query manager 431 can identify an error in a query. In some embodiments, operation 602 can be consistent with operation 502 of method 500.

At operation 604, the query manager 431 can determine the scope of the error. In some embodiments, operation 604 can use the analysis of operations 504 to 508 of method 500 to determine the scope of the error. Further, the scope of the error can include a portion of the access plan and/or code that causes the error. This can be identified by analyzing each of the alternate execution structures. This analysis can show which portion of the structure causes the results to differ.

At operation 606, the query manager 431 can identify one or more other queries within the scope or the error. In some embodiments, a query is within the scope of the error if it is a similar query. This can be determined by comparing the identified query against other queries received by query manager 431. Further, the other queries can include some or all of the queries that are owned/operated by the owner of the identified query. In some embodiments, the other queries can be queries associated with the source of the identified query (e.g., host 405, application 412, database manager 411, etc.). Additionally, queries can be similar if the queries have a similar target. The target can be the target database, a target table, and/or a target column or set of data within a table. In some embodiments, the query can be similar if it includes a common action/command. A common command can include a common instruction (e.g., code), and/or a common structure. The common structure can be the entire structure, or a branch or other portions of the structure of the access plan.

At operation 608, the query manager 431 can determine if there are additional queries to check for errors. In some embodiments, each query identified in operation 606 is checked for errors. If there are additional queries to check for errors (608:YES), the query manager 431 proceeds to operation 610. This can occur if any of the queries identified within the scope of the error have not been checked for errors. If there are no additional queriers to check for errors (610:NO), the query manager 431 proceeds to operation 616.

At operation 610, the query manager 431 can perform an error analysis of the query. In some embodiments, the error analysis can include inspecting the results for errors. This inspection can be performed by a user. Further, the inspection can include generating alternate execution structures and comparing the results against the original structure. This can include operations 504 through 510 of method 500.

At operation 612, the query manager 431 can determine if there is an error in the query. In some embodiments, the query includes an error when the alternate structures produce a different result than the original structure. In another example, the query includes an error if the result of the original query is not the same as the majority (or at least a portion of) of the results from the alternate execution structures. Additionally, an error can be identified by a user as a result of the inspection of the results. The determination can be received by query manager 431 from the user.

If it is determined the query does have errors (612:YES), then query manager 431 proceeds to operation 614. If it is determined the query does not have errors (610:NO), then query manager 431 return to operation 608.

At operation 614, the query manager 431 can correct the error in the query. In some embodiments, operation 614 can be consistent with operation 512 of method 500. Upon completion of operation 614, query manager 431 returns to operation 608. At operation 616 query manager 431 displays results. Additionally, the operation 616 is consistent with operation 514 of method 500.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying an error in a first query, wherein the identifying is in response to a database receiving the first query;
    generating a set of alternate execution structures for the first query, wherein the set of alternate execution structures includes at least two alternate execution structures;
    running each of the alternate execution structures, wherein the running includes generating a set of results corresponding to each alternate execution structure in said set of alternate execution structures;
    comparing, in response to the running, each of the set of results against each of the other sets of results, wherein the comparing is configured to identify an expected set of results;
    storing each of the set of alternate execution structures to include a result of the set of results, for each alternate execution structure;
    selecting, in response to the comparing, from the set of alternate execution structures, a first alternate execution structure based on the first alternate execution structure outputting the expected set of results; and
    implementing the first alternate structure in place of the first query.

2. The method of claim 1, wherein the first query is configured to return the expected set of results; and
    the identifying the error in the first query is further in response to:

executing the first query where the first query returns an actual set of results; and determining the expected set of results is different than the actual set of results.

3. The method of claim 2 further comprising:
grouping alternate execution structures in a group wherein each set of results within the group are equivalent; and
selecting the first alternate execution structure from the group that includes a greatest number of alternate execution structures, wherein the set of results that includes the greatest number of alternate execution structures include the expected set of results.

4. The method of claim 2, wherein the identifying an error is in response to an update of the database.

5. The method of claim 4, wherein a random set of queries are executed in response to the update to check for errors.

6. The method of claim 5, wherein the expected set of results is based on the first query from the set of queries being executed prior to the update.

7. The method of claim 1, wherein each set of results includes execution statistics.

8. The method of claim 7, wherein selecting the first alternate structure is based on the execution statistics for the first alternate structure being most similar to a first query execution statistics.

9. The method of claim 1, wherein selecting the first alternate structure is based on the first alternate structure being closest to an actual execution structure of the first query.

10. The method of claim 1, wherein the set of alternate execution structures includes at least a best execution structure and a safest execution structure.

11. The method of claim 1, wherein the first query includes an original execution structure, and the selecting the first alternate execution structure is based on the first execution structure being most similar to the original execution structure and the implementing the first alternate structure is in response to receiving an approval from a user.

12. The method of claim 1, further comprising:
determining a scope of the error in the first query;
identifying a second query;
determining the second query contains a second error with the scope of the error; and
correcting the second error.

13. The method of claim 12, wherein the identifying the second query is based on a characteristic of the first query matching a characteristic in the second query.

14. A system comprising:
a processor; and
a computer-readable storage medium communicatively coupled to the processor and storing program instructions which, when executed by the processor, are configured to cause the processor to:
identify, in response to a database receiving a first query, a first error in the first query;
determine a scope of the first error;
identify a second query, wherein the second query includes a characteristic in common with the first query;
determine the second query contains a second error within the scope of the first error;
generate, for the second query, a set of alternate execution structures, wherein the set of alternate execution structures includes at least two alternate execution structures;
run each alternate execution structure in the set of alternate execution structures;

compare, in response to the running, each of the set of results against each of the other sets of results, wherein the comparing is configured to identify an expected set of results;
select, in response to the running, a second alternate execution structure from the set of alternate execution structures, wherein the selection is based on the second alternate execution structure outputting the expected set of results; and
replace an execution structure of the first query with the second alternate execution structure.

15. The system of claim 14, wherein the common characteristic includes a common source.

16. The system of claim 14, wherein the common characteristic includes a common target and the common target can be selected from a group consisting of, the database, a table, and a column.

17. The system of claim 14, wherein the program instructions are further configured to cause the processor to:
compare a set of results for each alternate execution structure against each other sets of results;
identify a most common set of results; and
wherein the determination the second error is contained in the second query is based on a first set of results from the first query being different than the most common set of results.

18. A computer program product, the computer program product comprising a computer readable storage medium having program instructions embodied therewith, the program instructions executable by a processing unit to cause the processing unit to:
identify an error in a first query, wherein the identifying is in response to a database receiving the first query, wherein the set of alternate execution structures includes at least two alternate execution structures;
generate a set of alternate execution structures for the first query;
run each of the alternate execution structures, wherein the running includes generating a set of results corresponding to each alternate execution structure in said set of alternate execution structures;
compare, in response to the running, each of the set of results against each of the other sets of results, wherein the comparing is configured to identify an expected set of results;
store each of the set of alternate execution structures to include a result of the set of results, for each alternate execution structure;
select, in response to the comparing, from the set of alternate execution structures, a first alternate execution structure based on the first alternate execution structure outputting the expected set of results; and
implement the first alternate structure in place of the first query.

19. The computer program product of claim of claim 18, wherein the program instructions are further configured to cause the processing unit to:
group each alternate execution structures into a group wherein each set of results within the group are equivalent; and
select the first alternate execution structure from the group that includes a greatest number of alternate execution structures, wherein the first alternate execution structures contains an expected set of results.

20. The computer program product of claim of claim 19, wherein the first query includes an original execution structure, and the selecting the first alternate execution structure is based on the first alternate execution structure being most similar to the original execution structure.

* * * * *